United States Patent
Buchmann et al.

(10) Patent No.: US 8,010,376 B2
(45) Date of Patent: *Aug. 30, 2011

(54) ON-REQUEST VIEWS OF BUSINESS OBJECT TYPES

(75) Inventors: Daniel Buchmann, Eggenstein-Leopoldshafen (DE); Uwe E. Fischer, Karlsruhe (DE); Jochen Hönig, Öhringen (DE); Oliver Scheerer, Nuβloch (DE); Bernhard P. Waldscheck, Karlsruhe (DE)

(73) Assignee: SAP AG, Walldorf (DE)

( * ) Notice: Subject to any disclaimer, the term of this patent is extended or adjusted under 35 U.S.C. 154(b) by 1292 days.

This patent is subject to a terminal disclaimer.

(21) Appl. No.: 11/639,835

(22) Filed: Dec. 15, 2006

(65) Prior Publication Data

US 2008/0147421 A1   Jun. 19, 2008

(51) Int. Cl.
*G06Q 10/00* (2006.01)
*G06F 9/44* (2006.01)
(52) U.S. Cl. .......................... 705/1.1; 717/107
(58) Field of Classification Search .................. None
See application file for complete search history.

(56) References Cited

U.S. PATENT DOCUMENTS

| | | | | |
|---|---|---|---|---|
| 2002/0059264 A1* | 5/2002 | Fleming et al. | | 707/100 |
| 2002/0116389 A1* | 8/2002 | Chen et al. | | 707/103 R |
| 2002/0133368 A1* | 9/2002 | Strutt et al. | | 705/1 |
| 2004/0133552 A1* | 7/2004 | Greenfield et al. | | 707/1 |
| 2005/0027674 A1* | 2/2005 | Potter et al. | | 707/1 |
| 2007/0118551 A1* | 5/2007 | Akkiraju et al. | | 707/102 |

\* cited by examiner

*Primary Examiner* — Jonathan Ouellette
(74) *Attorney, Agent, or Firm* — Mintz, Levin, Cohn, Ferris, Glovsky and Popeo, P.C.

(57) ABSTRACT

A request is received to initiate an operation (e.g., a query, etc.) on a view on a business object type. Such a request contains data characterizing the view which in turn characterizes a plurality of hierarchically arranged elements. Such elements characterized are associated with elements characterized by one or more business objects types. Thereafter, the operation is performed on the elements of the two or more business objects types. Responsive results of the operation responsive are mapped to the elements of the virtual business object type. After such mapping occurs, a message is generated that contains the results of the request in a structure compatible with the view.

12 Claims, 3 Drawing Sheets

ON-REQUEST VIEWS OF BUSINESS OBJECT TYPES

TECHNICAL FIELD

The subject matter described herein relates to computer-based mechanisms for modeling views on business object types.

BACKGROUND

Most companies have a multitude of computer systems executing business processes, such as business applications, networks, databases, and the like, and all of these systems contain data (documents or any kind of objects) that are relevant for particular business processes. The same is true even for cross company networks or inter-company systems.

When different systems are utilized, different business object types may be implicated. In addition, even if such systems contain business object types of the same business semantics, technical implementations (structure, naming, etc.) may still differ. For communications between two systems, there must be a common format despite the differing technical implementations. Furthermore, the scope of data to be transferred (i.e., which parts/segments of a business object type, etc.) varies greatly from business process to business process.

Currently, views on business object types can be defined statically, and have to be implemented individually. Alternatively, one can build views on the level of the database; thereby losing the business context (table lines instead of business objects, all business validations of data lost, etc.). These approaches are limited by the business needs (no mere access on data base level) and the effort to realize a static view on a business object type.

SUMMARY

A request to initiate an operation (e.g., query, etc.) is received that contains data characterizing the view on a business object type. A business object type may characterize a plurality of hierarchically arranged elements (e.g., attributes, fields, nodes, segments, etc.). The view may also characterize a plurality of hierarchically arranged elements (e.g., attributes, fields, nodes, segments, etc.). The elements characterized by the view can be associated with elements characterized by two or more business object types so that the operation takes place on the elements of the two or more business object types. Responsive results of the operation can be mapped to the elements of the view so that a message containing such results can be generated in a structure compatible with the view.

The association may be provided by the initiator of the request as part of the view definition. This provision can be the result of user-generated input (directly during the currently running process, or indirectly in form of a configuration). The view definition may also be generated automatically by the requesting business process, if it has the knowledge about the underlying business object types.

The request can define join conditions among the two or more business object types. If so, the request can identify a leading business object type. If the operation is a query, the query can be first delegated to an application associated with the leading business object type to obtain responsive data. Thereafter, the query can be delegated to the other business object types which can be defined by join conditions.

In other implementations, the view is a projection of a single business object type in that only a subset of the elements of the business object type are used to form the view.

In an interrelated aspect, a request to initiate an operation is received. Such a request can contain data characterizing the view which in turn is a projection of a business object type. Thereafter, the operation on projected elements of the business object type can be performed. A message can then be generated that contains results of the request in a structure compatible with the view.

In one implementation, the following process flow may be utilized. Initially, a consumer (e.g., consuming system, etc.) can define a virtual, transient business object type (i.e., view, etc.) 'Business Partner' that reflects the consumer data requirement. The view is based on the defined business object types 'Customer' and 'Supplier' at the provider side. A node 'address' is selected from 'Customer' business object type and node 'bank data' is selected from 'Supplier' business object type. Any other data from either 'Customer' or 'Supplier' is not required in the view. A join on ID field is defined such that 'Customer name'='Supplier name'. Thereafter, a query is defined: ID contains 'Sco*'. After the query is defined, a request message is built and sent that includes the definition and the query parameters.

A provider (i.e., providing system) receives the message and analyzes the definition portion of the message. The definition enables the provider to map to local persisted and predefined business object types 'Customer' and 'Supplier'. Once this mapping is accomplished, a query can be run on 'Customers' (all with 'Sco*'). Subsequently, all suppliers with ID in the result of the previous query are read (i.e., a join is executed). The result is then mapped to a format compatible with the view/composite business object type 'Business Partner' while complying with the metadata of the request. A message is then generated using this data and transmitted to the consumer. The consumer can then initiate an operation using the result data provided in the 'Business Partner' format.

In another implementation, the business object types 'Customer' and 'Supplier' may not be provided by a single provider. In this case one of the providers involved receives the request from the consumer. After having evaluated the assignment of 'Customer' and 'Supplier' a data ownership component (for example, see U.S. patent application Ser. No. 11/433,151 entitled "Services for Data Access Based on a Data Ownership Director in Distributed System Landscapes", the contents of which are hereby fully incorporated by reference) is used to identify the providers responsible. The individual request is transmitted to those providers and processed by the providers or it is processed locally if the ownership is local. Finally, the dispatching provider processes the view based on the data returned from the providers.

In yet a further interrelated aspect, a message characterizing a composite business object and a query is received. Using this information, the composite business object is associated with two or more data sources using an object model repository. Transmission of a message containing results responsive to the query having a format compatible with the composite business object is subsequently initiated.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current techniques permit a dynamic definition of view on business object types thereby obviating the need for a consuming system to identify relevant data sources required to instantiate a business object type. In general, the aim of the current subject matter is that the consumer consumes the data in the way it is accustomed to (expressed by the view) while the provider application keeps providing data in the way it is accustomed to (utilizing the business object types associated with the view). The abstraction layer provided here addresses integration issues in a flexible, on-request manner. Such an arrangement affects structural integration (e.g., transformation, projection, join, etc.) as well as physical localization integration (e.g., federation of data, etc.). Thus, the consumer and provider are completely decoupled.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
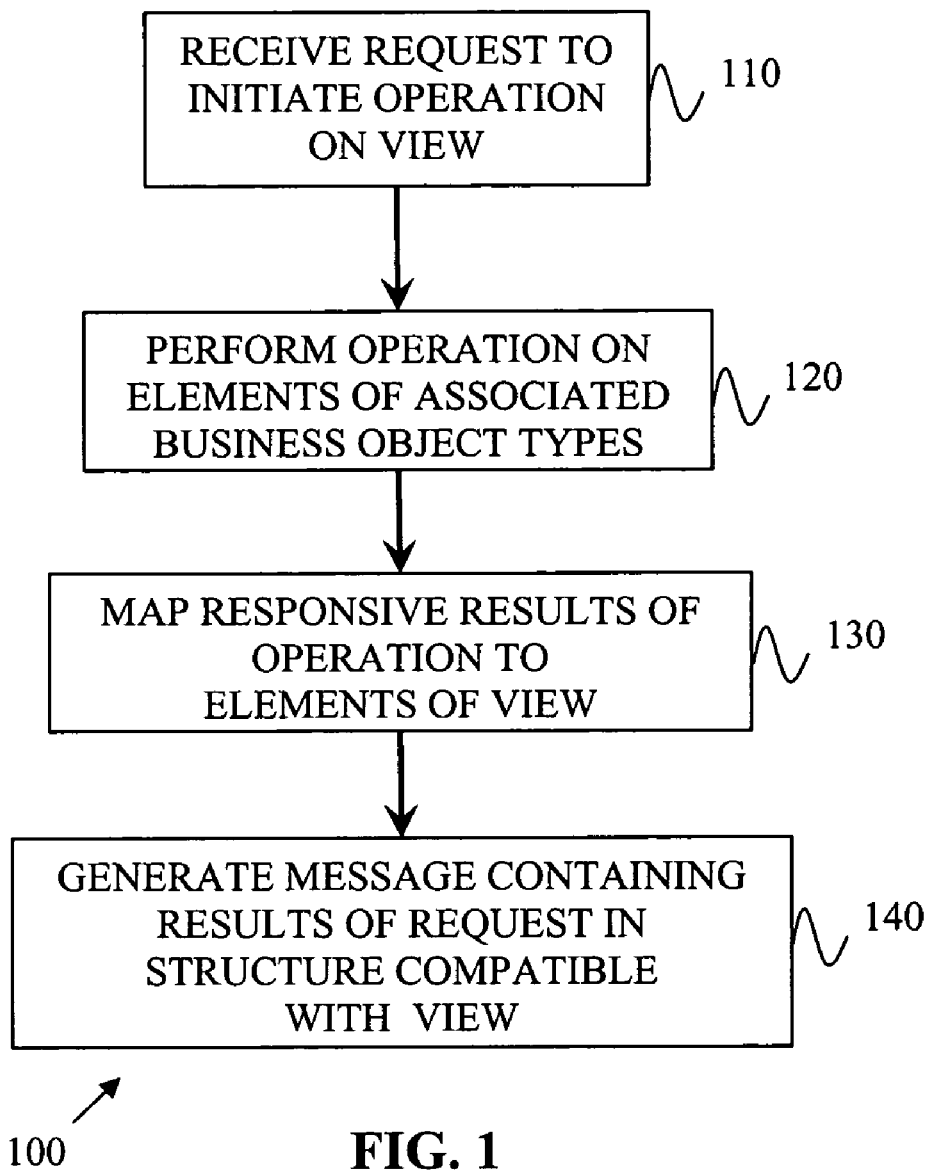
FIG. 1 is a process flow diagram illustrating processing of a request characterizing a virtual business object.

FIG. 1 is a process flow diagram illustrating a method 100 in which, at 110, a request is received to initiate an operation (e.g., a query, etc.). Such a request contains data characterizing the view which in turn characterizes a plurality of hierarchically arranged elements that are in turn associated with elements characterized by two or more business object types. Thereafter, at 120, the operation is performed on the elements of the two or more business object types. Responsive results of the operation responsive are mapped, at 130, to the elements of the view. After such mapping occurs, a message is generated, at 140, that contains the results of the request in a structure compatible with the view definition.

Figure 2:
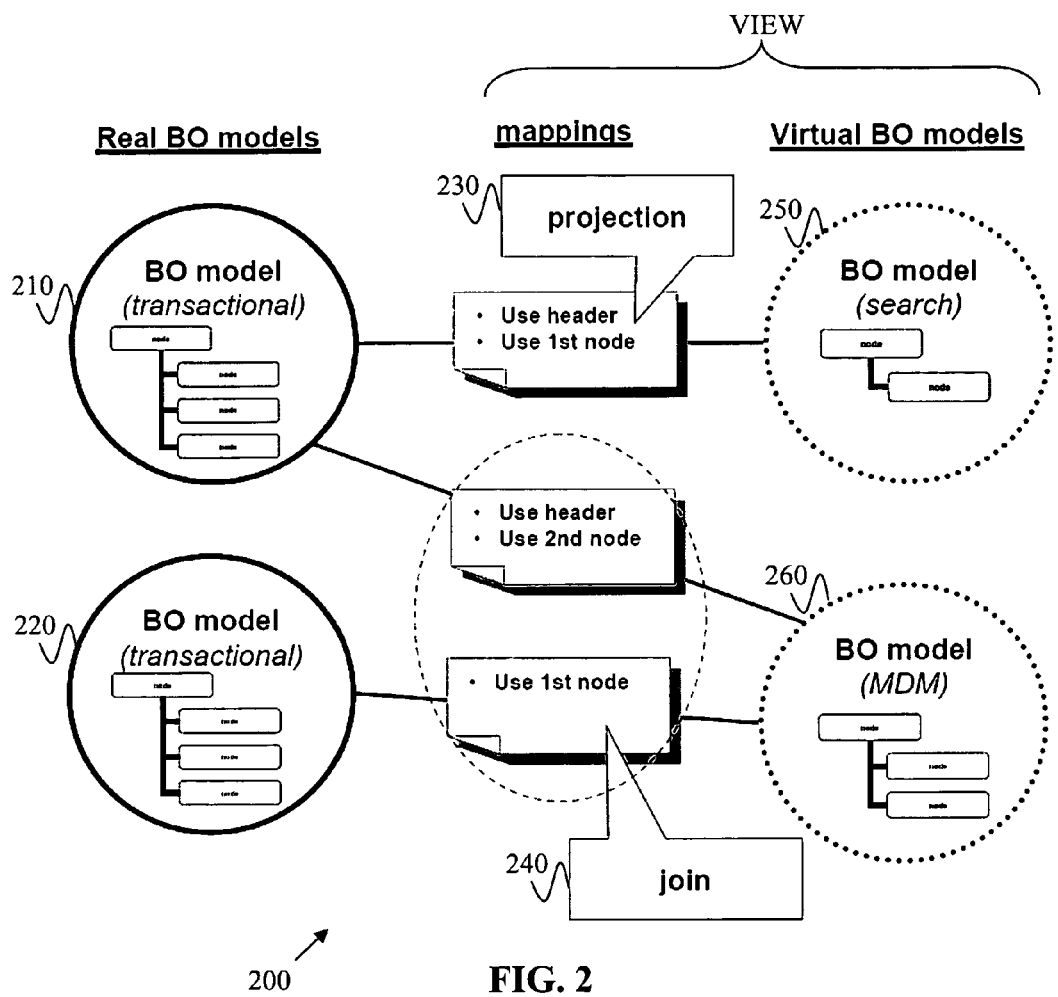
FIG. 2 is a process flow diagram illustrating a virtual business object types generated through a projection and through joining two or more business object types.

FIG. 2 is a schematic diagram 200 illustrating two techniques in which views may be created. A view can include references to other business objects (i.e., a Sales Order may refer to a Business Partner (customer) and/or a Product object. The view is not persisted, and thus provides a flexible technique for abstracting data that is distributed with respect to business object models or physical storage. In other words, a view is an abstract business object model and can be consumed as such. In contrast to non-abstract business object models, the view binds to the data via associations to non-abstract business object models Referring back to FIG. 2, in a first variation, a projection 230 is made from a first business object type 210 to result in a first view 250. In this illustration, the first view 250 includes the header and a first node from the first business object type 210 while omitting the second and third nodes. Projections of business objects may be based, for example, on business object templates, such as those described in U.S. patent Ser. No. 11/526,136, the contents of which are hereby incorporated by reference. In a second variation, a second view 260 is generated as a result of a join operation 240 in which a header and a second node from the first business object type 210 are joined with a first node from a second business object type 220 to form a second view 260.

Figure 3:
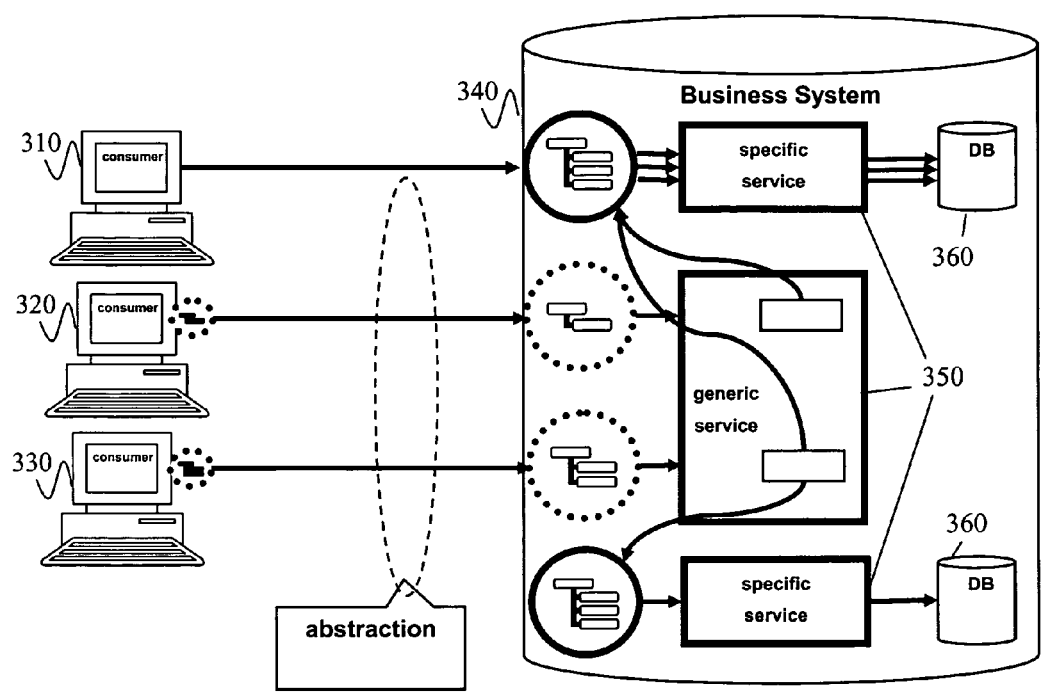
FIG. 3 is a first schematic diagram illustrating a plurality of consumer systems coupled to a provider system.

FIG. 3 is a diagram illustrating a system 300 that includes a plurality of consumer systems 310, 320, 330, and a business system 340 (also referred to as a provider system). It will be appreciated that any number of consumer systems and business systems may be used in connection with the techniques described herein.

A request to conduct an operation (e.g., CRUD—create, retrieve, update, delete; query, etc.) on a business object type can be formulated at one of the consumer systems 310, 320, 330. Such a request includes a view definition and a reference to the non-abstract business object model, as defined by 310, or the business object types associated with the object model (e.g., Business Partner, Product, Business Object Model, etc.), as defined by 320 and 330. The request is part of a service that specifies a set of data according to a predetermined structure that is expected in response to the request.

Object instances of other business object types have to be referred by their corresponding key. Values of foreign keys can be derived at run time if the foreign key relationship is part of the object model. Otherwise—if the objects in question are not linked on a model base-, the value(s) of the key(s) has/have to be explicitly identified in the request. For each business object type such an external key belongs to, the set of data to be returned can be specified as well (i.e., structurally). The composition can also be done cascading on several levels.

In some implementations, such as those in which a view is a composite business object type (i.e., the view is based on two more business object types), a leading business object type can be selected. The leading business object type is useful in that the header information from such a business object type is used in forming the view. Additionally, for each business object type, requested elements (attributes, fields, nodes, segments, etc.) from such business object types are characterized in the request.

For those variations in which a view comprises a composite business object type, a join condition is defined. The join condition can be one that is available in the model as an association (e.g., " . . . and get distinct data of the business partner who is related via the association type 'is married with'") or it can be a free join condition (e.g., "content of field X of business object type A has to equal the content of field Y of business object type B".

Once the request has been formulated, the consuming system 310, 320, 330 can define the operation to be conducted on the view. The input parameters for the operation is specified as name-value-list on the side of the provider system 340. Such a name-value-list can be either a fully specified object key or it can be a query with wildcards or key lists or a combination thereof.

Once the query has been formulated based on a pre-existing object model, then a message characterizing the object model and containing the query can be sent by the consumer system 310, 320, 330 to the provider system 340.

In response to receiving the request, in those cases in which a composite business object type is utilized, the provider system 340, can first delegate the query to an application of a type associated with the identified leading business object type (based on data characterizing the object model in the received message). Thereafter, data responsive to the query associated with the pre-determined elements of the leading business object type can be provided. Subsequently, query conditions, if any, can be enriched, for joined business object types by result of a start query linked by an 'AND' operator.

The query can later be delegated to applications associated with each joined business object type to obtain responsive data to the query until all join levels and all types of each join level are processed. Thereafter, a response message having a structure compatible with the view can be built from the consolidated query results. The transformation of the results to the format of the view makes use of the view definition contained in the request message.

In some variations, a service 350 can handle the dispatching of the queries thereby obviating the need for the consuming systems 310, 320, 330 to characterize data sources 360 associated with the provider system 340. A data ownership directory, such as that disclosed in U.S. patent Ser. No. 11/433,151, the contents of which are hereby incorporated by reference, can be used to determine where in the provider system landscape to obtain data of the initial business object types (those with indicated keys). In case of modeled foreign keys, the other business object type instances can be determined automatically from the result. This algorithm may be executed recursively until all requested foreign key relations are resolved.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a tangible machine-readable medium operable to cause data processing apparatus to perform operations comprising:
   receiving a request to initiate an operation, the request containing data characterizing a view, the view characterizing a plurality of hierarchically arranged elements, the elements characterized by the view being associated with elements characterized by two or more business object types, the request being a query and identifying a leading business object type;
   performing the operation on the elements of the two or more business object types;
   mapping responsive results of the operation to the elements of the view; and
   generating a message containing the results of the request in a structure compatible with the view;
   wherein the associating comprises delegating the query to a first application associated with the leading business object type, and receiving data responsive to the query from the first application.

2. An article as in claim 1, wherein the elements comprise one or more of attributes, fields, nodes, and segments.

3. An article as in claim 1, wherein the request defines join conditions among the two or more business object types.

4. An article as in claim 1, wherein the associating further comprises:
   further delegating the query to second applications associated with each of the business object types other than the leading business object type; and
   receiving further data from the second applications responsive to the query.

5. An article as in claim 4, wherein the generating a message comprises:
   building a message containing the received data responsive to the query.

6. An article as in claim 1, wherein the view comprises a projection of a business object type.

7. A computer-implemented method comprising:
   receiving a request to initiate an operation, the request containing data characterizing a view, the view characterizing a plurality of hierarchically arranged elements, the elements characterized by the view being associated with elements characterized by two or more business objects types, the request being a query and identifying a leading business object type;
   performing the operation on the elements of the two or more business objects types;
   mapping responsive results of the operation to the elements of the view; and generating a message containing the results of the request in a structure compatible with the view;

wherein the associating comprises: delegating the query to a first application associated with the leading business object type, receiving data responsive to the query from the first application, delegating the query to second applications associated with each of the business object types other than the leading business object type after delegating the query to the first application, and receiving further data from the second applications responsive to the query;

wherein the generating a message comprises: building a message containing the received data responsive to the query.

8. A method as in claim 7, wherein the elements comprise one or more of attributes, fields, nodes, and segments.

9. A method as in claim 7, wherein the request defines join conditions among the two or more business object types.

10. A method as in claim 7, wherein the view comprises a projection of a business object type.

11. An article comprising a tangible machine-readable medium operable to cause data processing apparatus to perform operations comprising:

receiving a request to initiate an operation, the request containing data characterizing a view, the view characterizing a projection of a business object type;

performing the operation on projected elements of the business object type; and generating a message containing results of the request in a structure compatible with the view;

wherein the projection of the business object is based on a business object template, the business object template comprising a plurality of hierarchically arranged entities and characterizing services associated with the entities, the business object comprising a subset of the plurality of hierarchically arranged entities.

12. An article comprising a tangible machine-readable medium operable to cause data processing apparatus to perform operations comprising:

receiving a message characterizing a composite business object and a query;

associating the composite business object with two or more data sources by polling an object model repository, the two or more data sources each comprising a business object type linked by a join condition;

obtaining data responsive to the query from the two or more data sources; and initiating a transmission of a message containing results responsive to the query having a format compatible with the composite business object.

* * * * *